(12) United States Patent
Campbell et al.

(10) Patent No.: US 11,325,551 B2
(45) Date of Patent: May 10, 2022

(54) VEHICLE AIRBAG CONTROL SYSTEM

(71) Applicant: NISSAN NORTH AMERICA, INC., Franklin, TN (US)

(72) Inventors: Stephanie Campbell, Commerce Township, MI (US); Karla Polyakova, Kodiak, AK (US); Tyler Sauerwein, West Bloomfield, MI (US); Alisha Martin, Howell, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 16/918,921

(22) Filed: Jul. 1, 2020

(65) Prior Publication Data

US 2022/0001822 A1    Jan. 6, 2022

(51) Int. Cl.
| | |
|---|---|
| *B60R 21/015* | (2006.01) |
| *B60R 21/20* | (2011.01) |
| *B60R 21/231* | (2011.01) |
| *B60R 21/08* | (2006.01) |
| *B60R 21/01* | (2006.01) |
| *B60R 21/2338* | (2011.01) |
| *B60R 21/264* | (2006.01) |
| *B60R 21/02* | (2006.01) |

(52) U.S. Cl.
CPC .... *B60R 21/0152* (2014.10); *B60R 21/01516* (2014.10); *B60R 21/08* (2013.01); *B60R 21/20* (2013.01); *B60R 21/231* (2013.01); *B60R 21/2338* (2013.01); *B60R 21/264* (2013.01); *B60R 2021/01006* (2013.01); *B60R 2021/01286* (2013.01); *B60R 2021/0273* (2013.01); *B60R 2021/23169* (2013.01); *B60R 2021/23176* (2013.01); *B60R 2021/23386* (2013.01)

(58) Field of Classification Search
CPC ............ B60R 21/015; B60R 21/01512; B60R 21/01516; B60R 21/01522; B60R 21/01524; B60R 21/01526; B60R 21/20; B60R 21/231; B60R 21/01; B60R 21/264; B60R 21/06; B60R 21/08; B60R 21/16; B60R 21/02; B60R 21/00; B60R 2021/23169; B60R 2021/01286; B60R 2021/01006; B60R 2021/23176; B60R 2021/0046; B60R 2021/0004; B60R 2021/0053; B60R 2021/065; B60R 2021/0213; B60R 2021/0273; B60R 2021/0293; B60R 2021/162
USPC .......................... 280/730.1, 743.1, 748, 749
See application file for complete search history.

(56) References Cited

U.S. PATENT DOCUMENTS

3,169,781 A * 2/1965 Abruzzino .............. B60R 21/06
                                                            280/749
5,161,820 A    11/1992 Vollmer
(Continued)

*Primary Examiner* — Keith J Frisby
(74) *Attorney, Agent, or Firm* — Global IP Counselors, LLP (57) ABSTRACT

A vehicle airbag control system has an airbag module, a detector and an electronic controller. The airbag module has an airbag that is configured to be positioned below a vehicle floor panel in an undeployed state. The airbag that is configured to be positioned to be above the vehicle floor panel in the deployed state. The detector is configured to detect a presence of an obstruction over the airbag module at a location above the vehicle floor panel. The electronic controller is programmed to deploy the airbag based on a detected result of the detector.

20 Claims, 8 Drawing Sheets

(56) References Cited

U.S. PATENT DOCUMENTS

| | | |
|---|---|---|
| 10,525,922 B1 | 1/2020 | Lin et al. |
| 2018/0099639 A1* | 4/2018 | Suemune ................ B60R 21/36 |
| 2020/0376989 A1* | 12/2020 | Simecek .................. B60N 2/42 |
| 2021/0046890 A1* | 2/2021 | Jayakar ............... B60R 21/2338 |

* cited by examiner

VEHICLE AIRBAG CONTROL SYSTEM

BACKGROUND

Field of the Invention

The present invention generally relates to a vehicle airbag control system. More specifically, the present invention relates to a vehicle airbag control system for a vehicle floor.

Background Information

A vehicle can include a variety of airbags as part of an occupant restraint system of the vehicle. The airbag is configured to absorb energy from an external impact and to control movement of one or more occupants inside of the vehicle. Vehicle airbags can be mounted in a variety of locations, such as inside a vehicle dashboard housing, from center consoles and or vehicle pillars. Additionally, airbags can be mounted to a vehicle roof structure to deploy from a position overhead of the vehicle seats. Further, airbags can be movable or rotatable to deploy at different positions depending on need or circumstances.

SUMMARY

In view of the state of the known technology, one aspect of the present disclosure is to provide a vehicle airbag control system comprising an airbag module, a detector and an electronic controller. The airbag module has an airbag that is configured to be positioned below a vehicle floor panel in an undeployed state. The airbag is configured to be positioned to be above the vehicle floor panel in the deployed state. The detector is configured to detect a presence of an obstruction over the airbag module at a location above the vehicle floor panel. The electronic controller is programmed to deploy the airbag based on a detected result of the detector.

In view of the state of the known technology, another aspect of the present disclosure is to provide a vehicle airbag control system comprising a vehicle floor panel, an airbag module, a detector and an electronic controller. The airbag module is stored in a compartment below the vehicle floor panel. The detector is configured to detect a presence of an obstruction over the airbag module. The electronic controller is programmed to deploy the airbag based on a detected result of the detector.

In view of the state of the known technology, another aspect of the present disclosure is to provide a vehicle airbag module comprising an inflatable portion and a restraining portion. The inflatable portion has a ring-like shape and an opening. The restraining portion being webbing extending from the inflatable portion into the opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
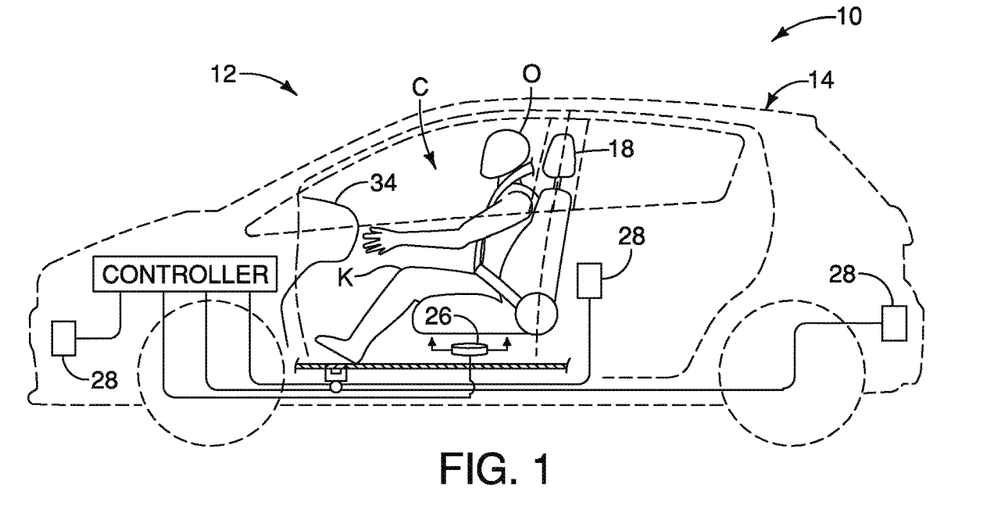
FIG. 1 is a schematic view of a vehicle equipped with a vehicle airbag control system in accordance with an illustrated embodiment.

Referring initially to FIG. 1, a vehicle 10 is illustrated as being equipped with a vehicle airbag control system 12. The vehicle has a body panel 14 forming a passenger compartment having a vehicle floor panel 16. The vehicle includes a plurality of vehicle seats 18 (only one shown) within the passenger compartment. The vehicle airbag control system 12 includes an airbag module 20 having an inflatable airbag 22. In the illustrated embodiment, the vehicle airbag module 20 is disposed in front of the vehicle seat 18. In the illustrated embodiment, the airbag 22 is configured to contact an occupant O's knees K upon deployment. The airbag 22 is configured to be deployed from an area below the floor panel 16, as will be further described below.

The vehicle airbag control system 12 further comprises a detector 24 and an electronic controller (ECU). The detector (hereinafter "obstruction detector 24") is an obstruction detector 24 that detects whether there is an obstruction over the airbag module 20. For example, the obstruction detector 24 detects whether the occupant O's feet are placed over the airbag module 20 when the airbag 22 is not deployed. The vehicle airbag control system 12 further comprises another detector 26. The another detector (hereinafter "occupant detector 26") is an occupant detector 26 configured to detect a presence of the occupant O in the vehicle seat 18. The vehicle airbag module 20 further comprises one or more impact detectors 28 that detect an external impact to the vehicle 10. The detectors 24, 26 and 28 are in electrical communication with the ECU as seen in FIG. 1. That is, the detectors 24, 26 and 28 are all electrically connected to the ECU to receive and send information to and from the ECU. The ECU controls the airbag module 20 to inflate the airbag 22 based on detection results from the detectors 24, 26 and 28, as will be further discussed below.

Figure 2:
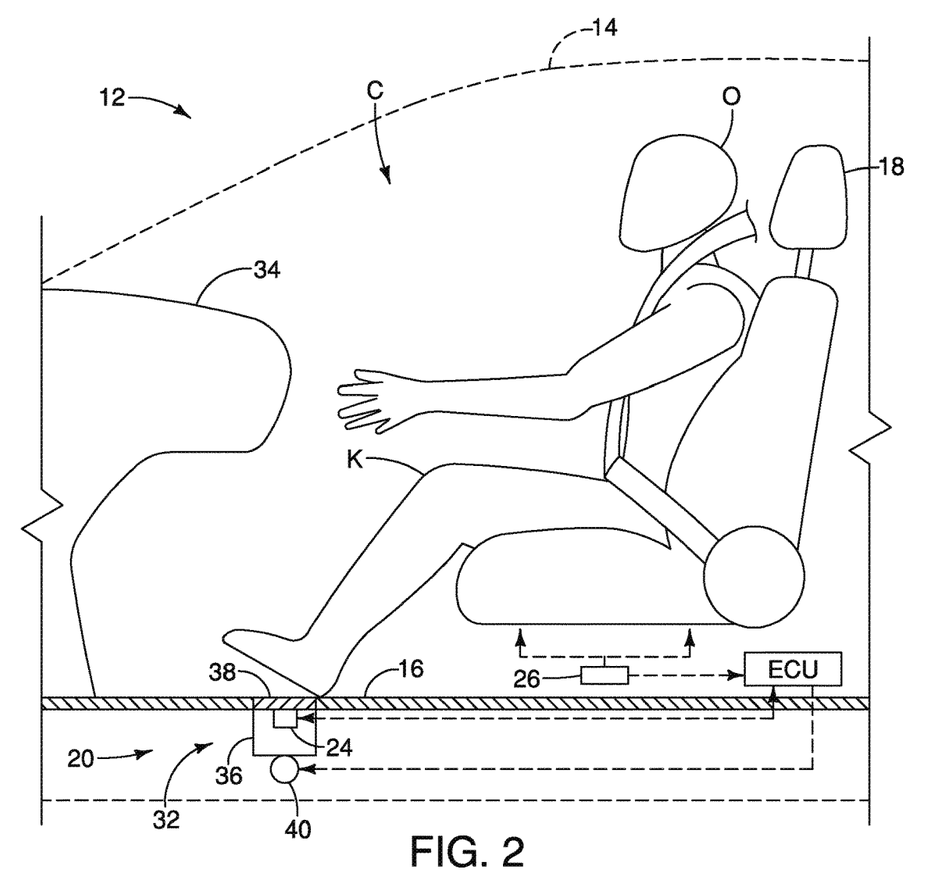
FIG. 2 is an enlarged schematic view of vehicle equipped with the vehicle airbag control system having an airbag module in an undeployed state.
Figure 3:
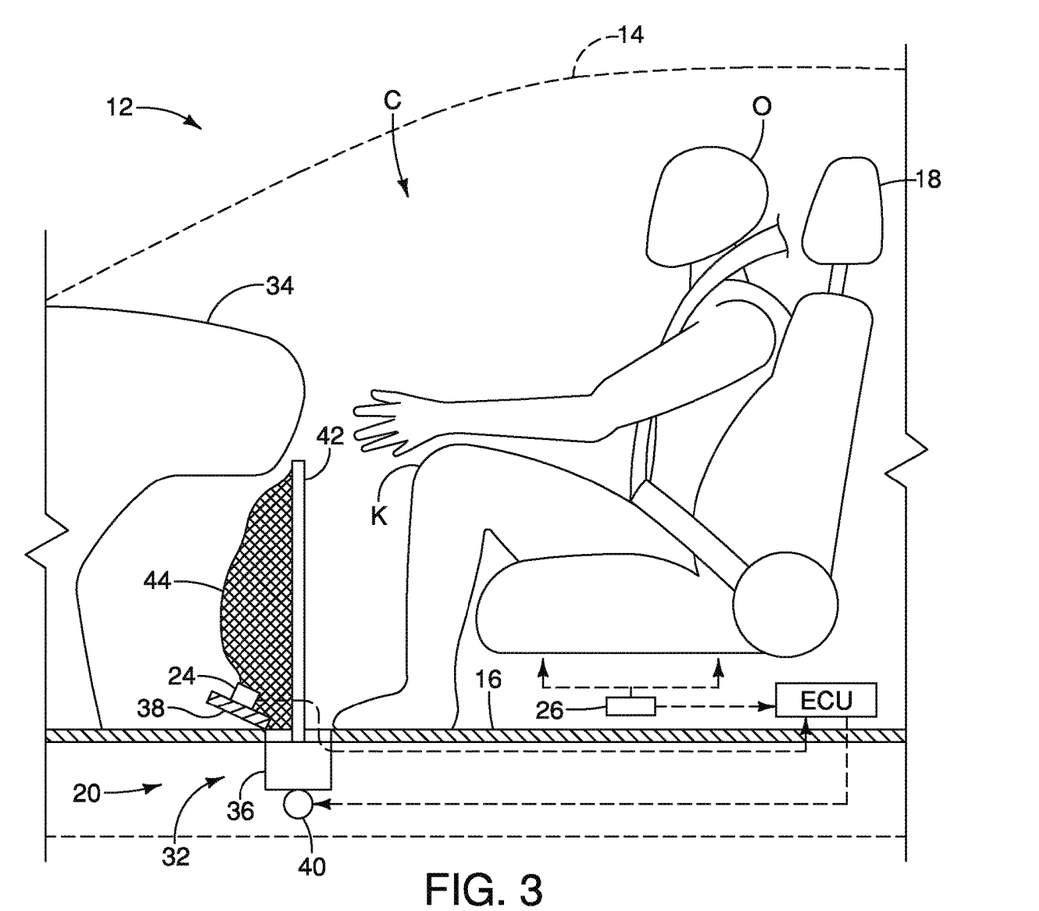
FIG. 3 is an enlarged schematic view of the vehicle airbag control system which the airbag module is in a deployed state.
Figure 4:
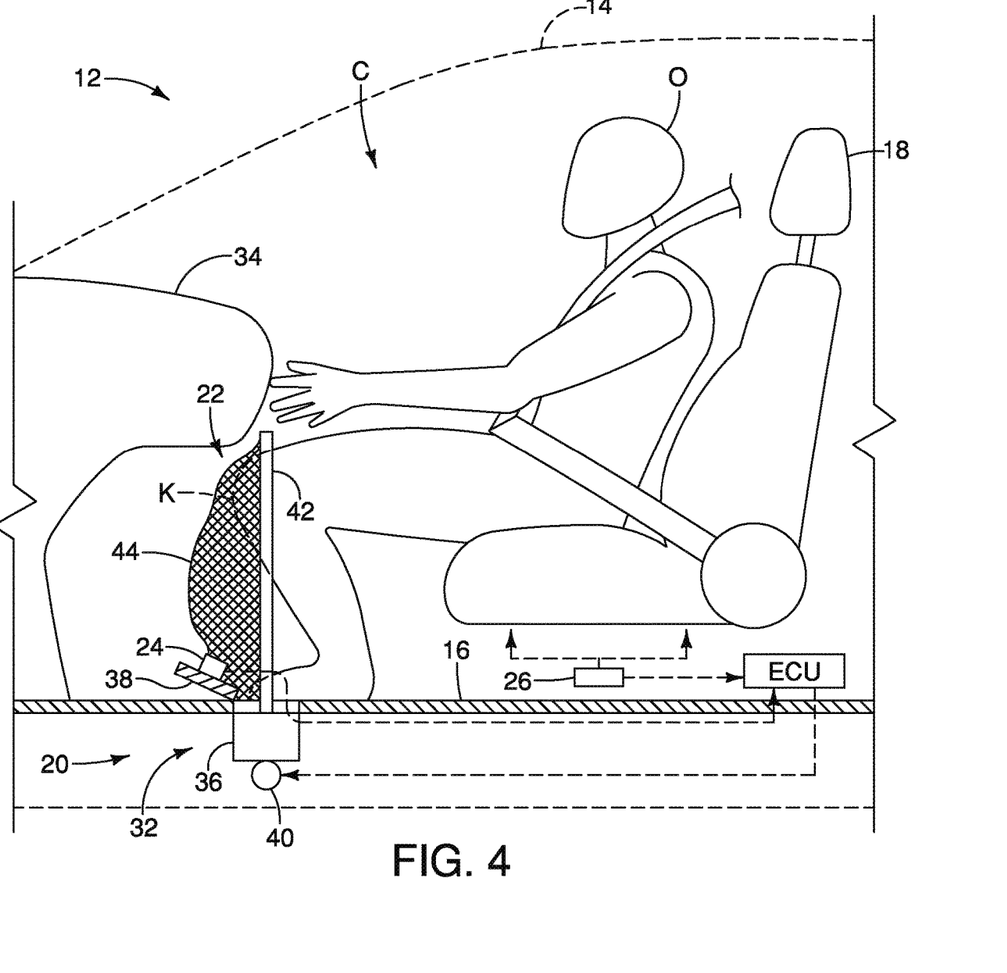
FIG. 4 is another enlarged schematic view of the vehicle airbag control system in which the airbag module is in a deployed state contacting an occupant's leas.
Figure 5:
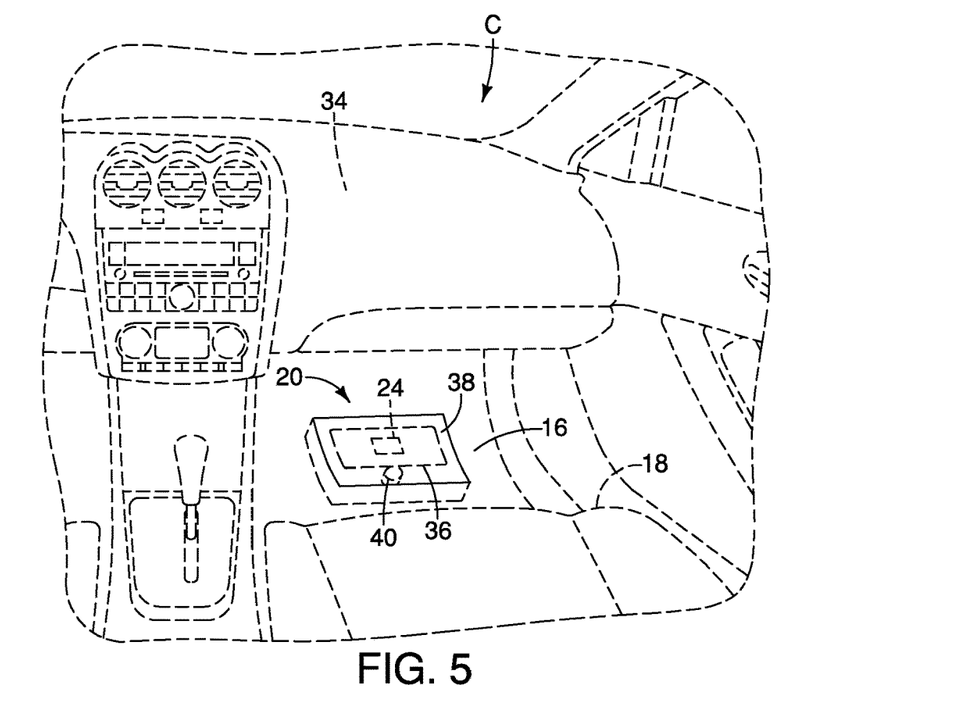
FIG. 5 is a view of the vehicle's passenger compartment in which the airbag module is in the undeployed state.
Figure 6:
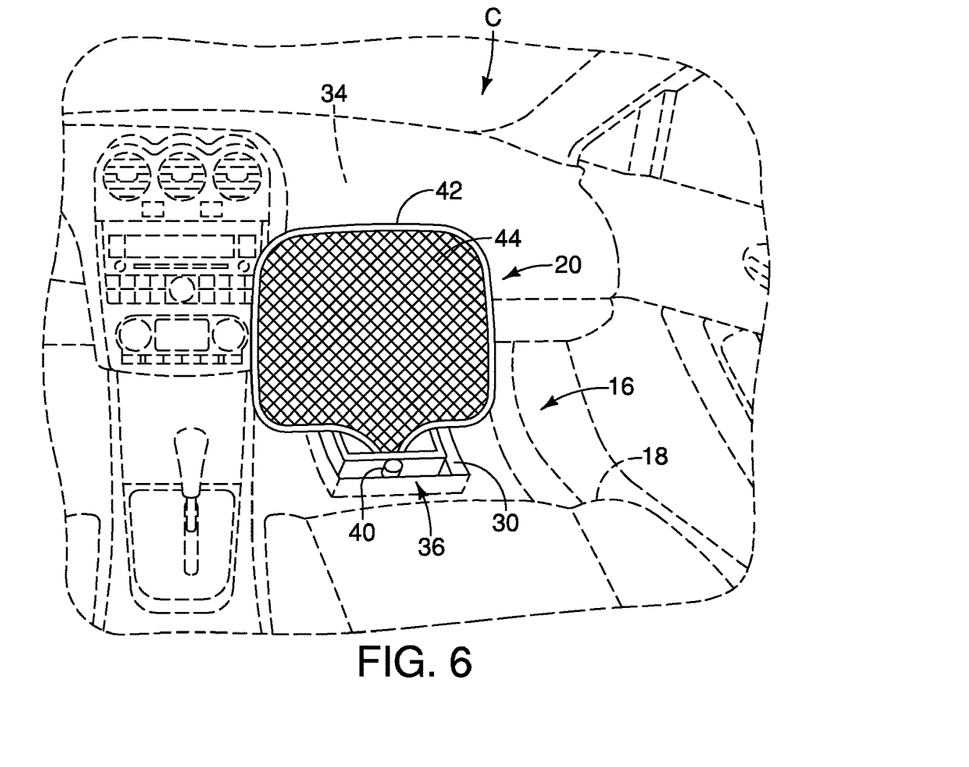
FIG. 6 is another view of the vehicle's passenger compartment in which the airbag module is in the deployed state.

Referring to FIGS. 2 to 6, the floor panel 16 has an opening 30 leading to a storage compartment (e.g., an airbag compartment 32) disposed underneath the floor panel 16. The airbag module 20 is stored in the airbag compartment 32 that is underneath the floor panel 16. As best seen in FIGS. 4 to 6, the opening 30 to the airbag compartment 32 is located between the vehicle seat 18 and a cockpit module 34 of the vehicle 10. That is, the opening 30 is located forward of the vehicle seat 18 but rearward of the cockpit module 34. In the illustrated embodiment, the cockpit module 34 is considered a vehicle body structure of the vehicle 10.

In this way, the airbag module 20 is disposed in the vehicle 10 such that the airbag 22 deploys at a position forward of the vehicle seat 18 to contact the occupant O's knees K but is not obstructed by the cockpit module 34, as best seen in FIGS. 2 to 4. When the occupant O's knees K contact the airbag 22, the airbag 22 helps maintain the occupant O in the vehicle seat 18. Therefore, the airbag 22 helps maintain the occupant O in the seated position in the event of the vehicle 10 experiencing an external impact. In this way, the airbag contacts the occupant's 10 legs to help prevent the occupant O from submarining below the seatbelt.

As shown in FIG. 3, the airbag module 20 includes the airbag 22 that is inflatable into a deployed state. The airbag module 20 further includes a housing 36 that houses the airbag 22. The housing 36 is stored in the airbag compartment 32. The housing 36 includes a lid 38 that is opened upon deployment of the airbag 22. As best seen in FIGS. 2 and 5, the lid 38 is flush with the floor panel 16 when the airbag 22 is not deployed. As seen in FIGS. 3, 4 and 6, the lid 38 is opened when the airbag 22 is deployed so that the airbag 22 extends from the housing 36 in the deployed state. The airbag module 20 further includes a generator 40 preferably comprising an ignitor and an inflator. The generator 40 is controlled by the ECU to inflate the airbag 22, as will be discussed. As seen in FIGS. 2 and 5, the airbag 22 is configured to be positioned below the vehicle floor panel 16 in the undeployed state. As seen in FIGS. 3, 4 and 6, the airbag 22 is configured to be positioned above the vehicle floor panel 16 in the deployed state.

Referring to FIGS. 3, 4 and 6 the airbag 22 includes an inflatable portion 42 and a restraining portion 44. As best seen in FIG. 6, the inflatable portion 42 is a flexible bag having a ring-like shape defining an opening. The inflatable portion 42 can be made of fabric such as woven nylon fiber. The inflatable portion 42 can alternatively be made of an elastic material such as rubber. The inflatable portion 42 has ends that extend from the housing 36 when the airbag is in the deployed state. The inflatable portion 42 is inflated by the generator 40.

The restraining portion 44 catches or contacts the occupant O's knees K or legs after the airbag 22 is deployed, As shown, the restraining portion 44 is webbing or a net extending from the inflatable portion 42 into the opening. The restraining portion 44 can be a flexible or elastic net that is attached to the inflatable portion 42. For example, the restraining portion 44 can be a fabric of nets or webbing that is stitched to inflatable portion 42. Alternatively, the restraining portion 44 can be a net of thin extruded plastic that is glued or adhered to the inflatable portion 42 by conventional means. The restraining portion 44 preferably has a lattice-like structure that is best shown in FIG. 6. However, it will be apparent to those skilled in the vehicle field from this disclosure that the restraining portion 44 can alternatively be a length of flexible fabric without a lattice structure that stretches across the opening of the inflatable portion 42 to catch the occupant O's legs.

The airbag 22 deploys when the vehicle 10 receives an external impact having the threshold level. The generator 40 receives an ignition signal from the ECU which activates the inflator and ignitor of the generator 40. The generator 40 is coupled to the airbag 18 by conventional means to inflate pressurized gas into the airbag 22 . Therefore, the ECU activates the generator 40 to deploy the airbag upon the impact detector 28 detecting the predetermined external force to the vehicle 10. For example, the ECU sends the ignition signal to activate the generator 40 upon the impact detector 28 detecting the external impact to inflate the airbag 22.

Referring to FIGS. 2 to 4, the obstruction detector 24 is configured to detect the presence of the obstruction over the airbag module 20 at a location above the vehicle floor panel 16. That is, the obstruction detector 24 detects whether there is an object disposed over the lid 38 of the airbag module 20 at a location above the lid 38. For example, the obstruction detector 24 can detect whether the occupant O's feet are positioned over the lid 38. Alternatively, the obstruction detector 24 can detect whether an external object is positioned over the lid 38 that would block deployment of the airbag. If there is not an obstruction over the lid 38, as seen in FIG. 4, the ECU controls the airbag 22 into the deployment position as seen in FIGS. 3 and 4.

In the illustrated embodiment, the obstruction detector 24 is disposed on the lid 38 of the housing 36. Therefore, the obstruction detector 24 is disposed at the housing 36 of the airbag module 20. Alternatively speaking, the obstruction detector 24 is disposed on the housing 36, such as disposed on the lid 38 of the housing 36 as shown in the illustrated embodiment. In the illustrated embodiment, the obstruction detector 24 detects a weight or a pressure exerted over the lid 38. For example, the obstruction detector 24 can be a load cell, a force transducer or a force sensor that detects weight that is applied to the airbag module 20 via the lid 38. In particular, the obstruction detector 24 can include one or more strain gage-based load cells that measures strain by means of a change in resistance.

When the lid 38 experiences a predetermined weight or pressure or is stressed (i.e., compressed or put under tension), there is a change in resistance which is proportionate to the amount of deflection. In the illustrated embodiment, the predetermined weight or pressure can be approximately 0.5 kilograms. That is, the ECU can control the airbag module 20 to not deploy the airbag 22 when the obstruction detector 24 detects the presence of the predetermined weight that is exerted on the airbag module 20. Alternatively speaking, the ECU can be programmed to not deploy the airbag 22 even if the impact detector 28 detects an external impact if the obstruction detector 24 detects a weight of 0.5 kilograms or more that is being exerted over the airbag module 20. The ECU can control the airbag module 20 to deploy the airbag 22 when the obstruction detector 24 does not detect a weight over the lid 38, or detects a weight that is less than the predetermined weight.

The occupant detector 26 detects the presence of the occupant O in the vehicle seat 18. Additionally, the occupant detector 26 can detect whether the occupant O is a child or an adult. The occupant detector 26 can also be a weight detector that detects a weight exerted on the vehicle seat 18. Therefore, the occupant detector 26 can be one or more strain-gage load cells that are disposed along the vehicle seat's 18 rails or at other locations on the vehicle seat 18. As shown, the occupant detector 26 is a load detector that detects a weight of the vehicle seat 18. The occupant detector 26 can alternatively be an in-vehicle camera that captures images of the passenger compartment C to determine the presence of an occupant O. The occupant detector 26 can also be an optical or infrared sensor disposed at the cockpit module 34 to detect the occupant O's approximate surface area and/or distance from the cockpit module 34 or other vehicle structures. The ECU can control the airbag module 20 to not deploy the airbag 22 when the occupant detector 26 does not detect the presence of the occupant O in the vehicle seat 18.

As seen in FIG. 1, the impact detectors 28 are in communication with the ECU. The ECU controls the airbag module 20 to inflate the airbag 22 upon the impact sensor detecting a predetermined external three to the vehicle 10, The vehicle airbag control system 12 preferably includes at least front, rear and side impact sensors, and/or other impact detectors 28 as appropriate and or necessary related to vehicle airbag deployment. The impact detector 28 can also be disposed at the vehicle's 10 doors. For example, the impact detectors 28 can be motion detectors, inertia switches or accelerometers. The impact detectors 28 can alternatively be vehicle camera(s) that captures images exterior to the vehicle 10 to detect an oncoming impact to the vehicle 10. Therefore, the vehicle 10 includes the impact detectors 28.

The ECU of the vehicle airbag control system 12 is preferably a microcomputer that includes one or more processor and one or more storage device (i.e., a computer memory device). The term "ECU" as used herein refers to hardware that executes a software program, and does not include a human. The microcomputer is programmed with an airbag deployment control program that controls the deployment of the airbag. The storage device is any computer storage device or any computer readable medium with the sole exception of a transitory, propagating signal. For example, the memory can be nonvolatile memory and volatile memory, and can includes a ROM (Read Only Memory) device, a RAM (Random Access Memory) device, a hard disk, a flash drive, etc.

The storage device is configured to store settings, programs, data, calculations and/or results of the processor(s). For example, the storage device of the ECU can store the predetermined weight exerted on the airbag module 20 that is to be detected by the obstruction detector 24. The storage device can also store the predetermined external force that is to be determined by the impact detector 28 necessary for deploying the airbag. The storage device can additionally store the predetermined weight exerted on the vehicle seat 18 and/or predetermined images for determining the presence of occupant O(s) in the vehicle 10.

Figure 7:
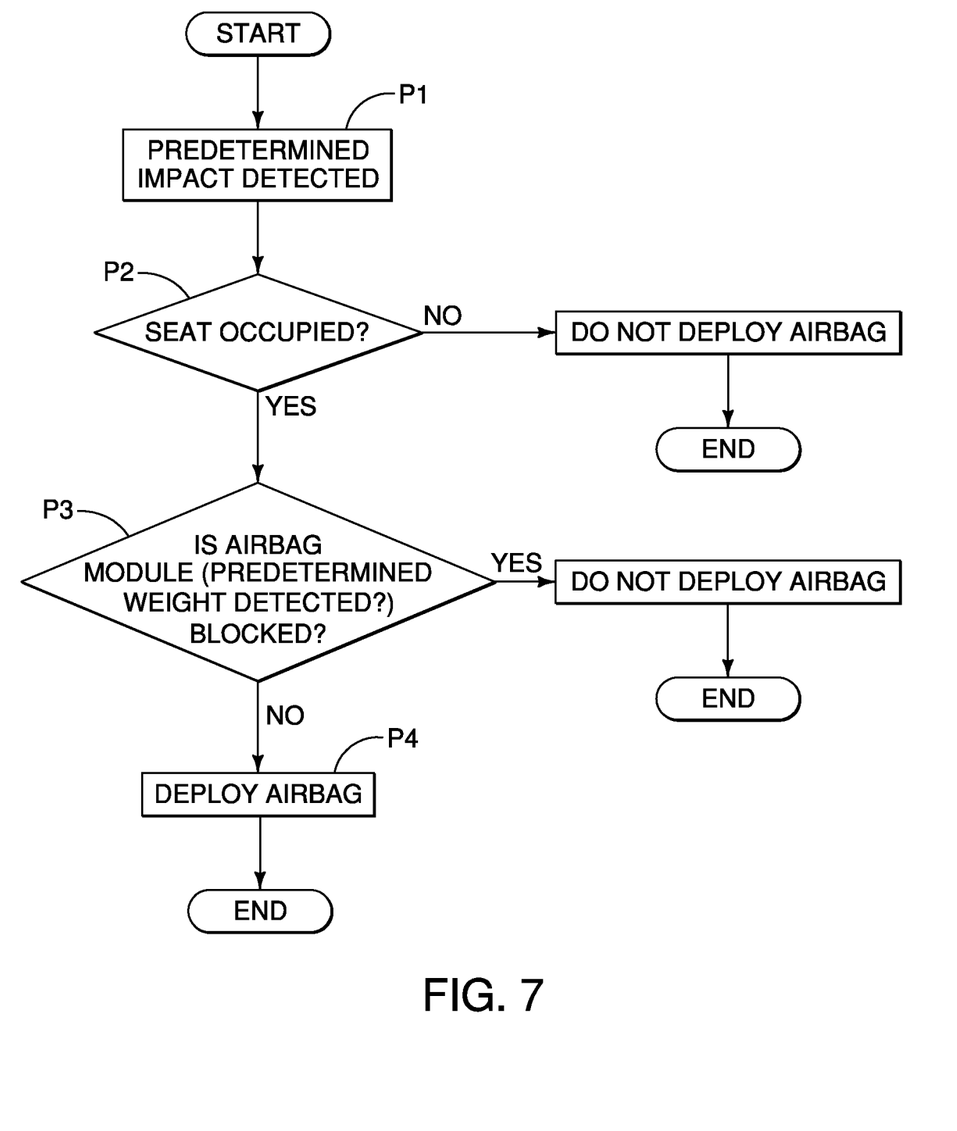
FIG. 7 is a flowchart showing an algorithm for the vehicle airbag control system.

The storage device can store algorithms for the microprocessor to determine whether or not to deploy the airbag 22, such as the algorithm as shown in FIG. 7. In step P1, the ECU will determine whether an external impact has been detected by any one of the impact detectors 28. If yes, the ECU will determine whether the vehicle seat 18 is occupied by an occupant O based on the detection results of the occupant detector 26 in step P2. If the ECU determines no, then the ECU will not send a deployment signal to the airbag module 20 so that the airbag 22 will not deploy and the process ends.

If the occupant detector 26 detects an occupant O in the vehicle seat 18, the ECU will determine whether there is an obstruction over the airbag module 20 based on the detection results of the obstruction detector 24 in step P3. If the obstruction detector 24 detects the presence of an obstruction upon detecting a weight that exceeds the predetermined weight, then the ECU will not send a deployment signal to the airbag module 20 so that the airbag 22 will not deploy and the process ends. However, if the obstruction detector 24 does not detect an obstruction or if the detector only detects a weight that is less than the predetermined weight or pressure, then the ECU will send a deployment signal to the airbag module 20 to deploy the airbag 22 in step P4.

The ECU is operatively coupled to the components of the airbag module 20 and the detectors in a conventional manner. In this way, the microcomputer of the ECU is programmed to control the airbag 22 based on detection results detected by the detectors 24, 26 and 28. The memory circuit stores processing results and control programs such as ones for airbag operation that are run by the processor circuit, The ECU transmits a generator 40 signal to the generator 40 of the airbag module 20 to deploy the airbag 22 as needed.

Figure 8:
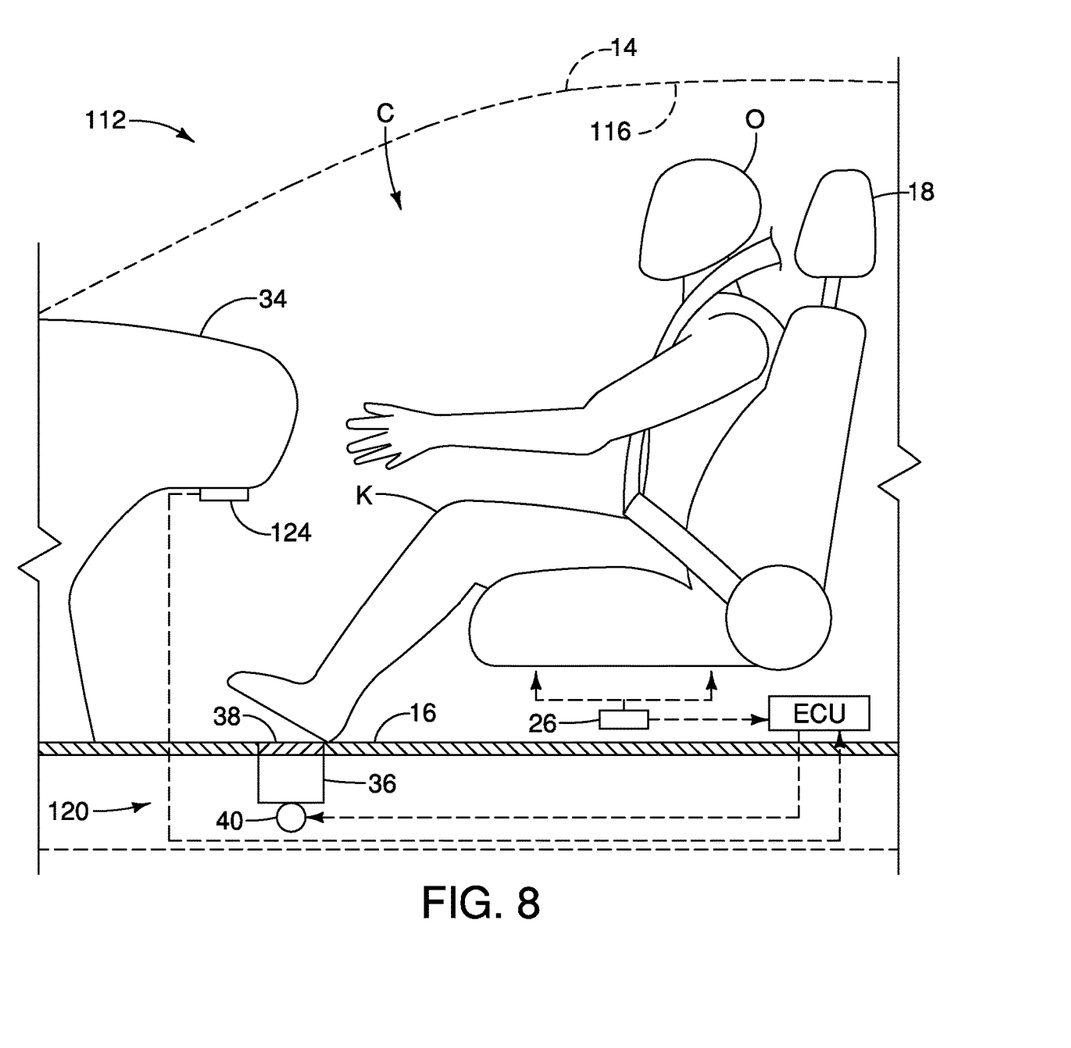
FIG. 8 an enlarged schematic view of the vehicle equipped with a modified vehicle airbag control system having an airbag module in an undeployed state.
Figure 9:
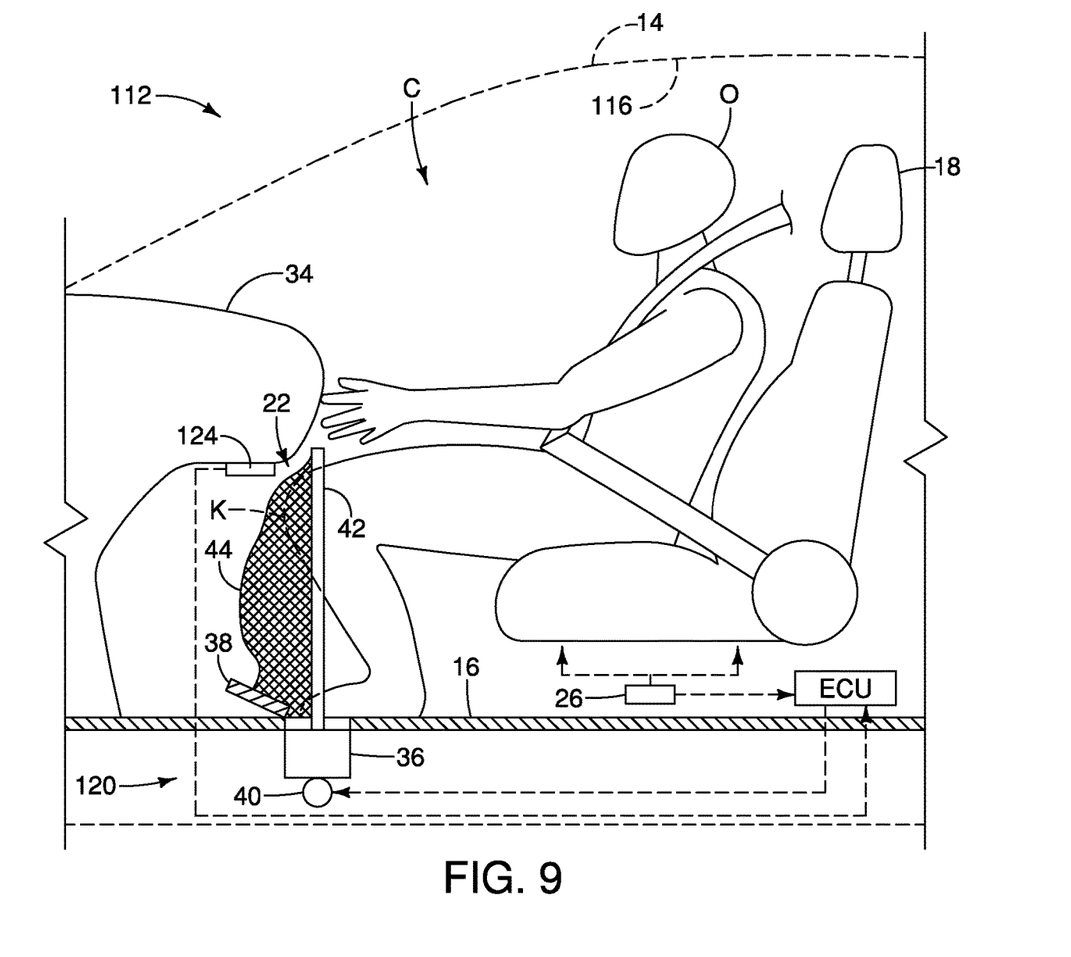
FIG. 9 is another enlarged schematic view of the modified vehicle airbag control system in which the airbag module in a deployed state.
Figure 10:
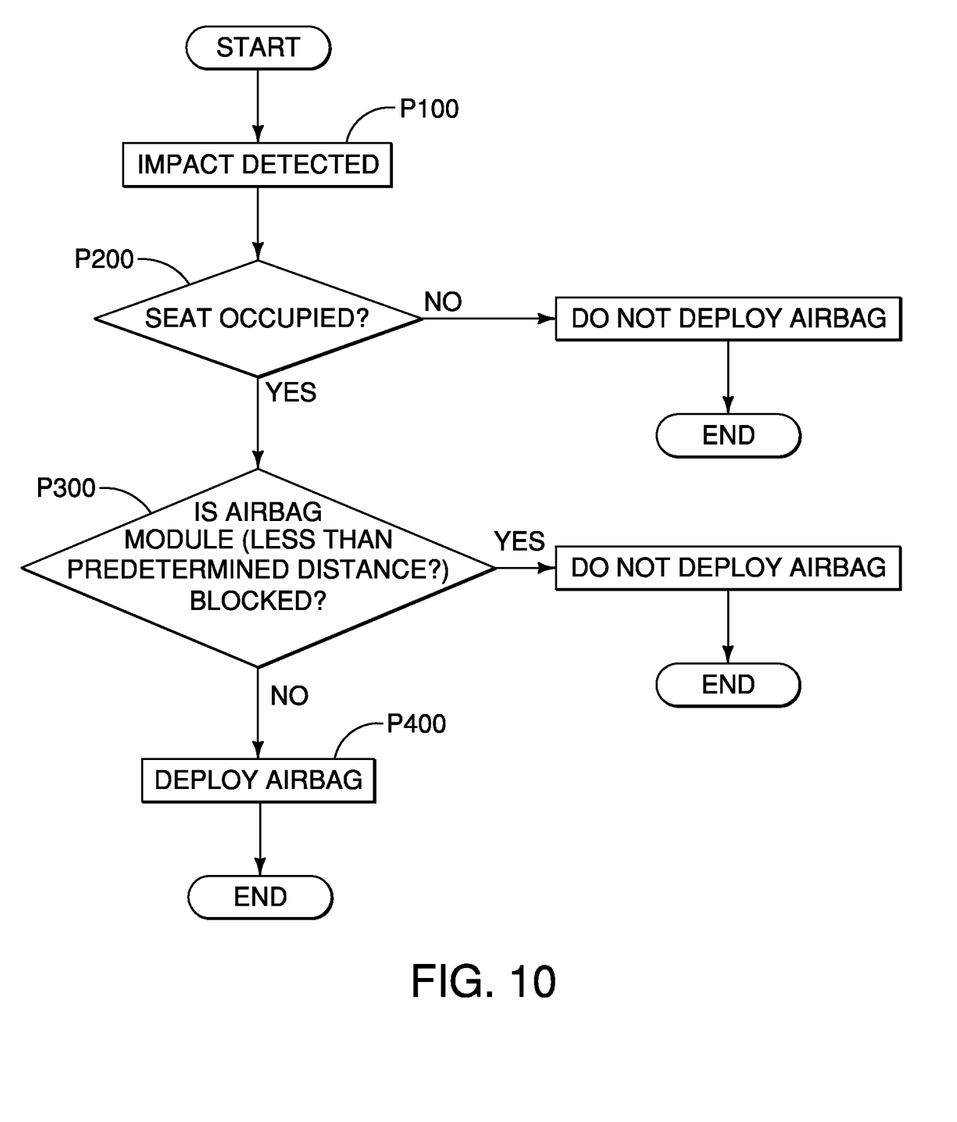
FIG. 10 is a flowchart showing an algorithm for the modified vehicle airbag control system.

Referring now to FIGS. 8 to 10, a modified vehicle airbag control system 112 that can be implemented with the vehicle of FIG. 1 is illustrated. The modified vehicle airbag control system 112 includes a modified airbag module 120 having an inflatable airbag 22 that is identical to the airbag 22 of the first illustrated embodiment. Like the airbag module 20, the modified airbag module 120 is disposed in front of the vehicle seat 18 and the airbag 22 is configured to contact the occupant O's knees K upon deployment to help maintain the occupant O in the vehicle seat 18 upon an external impact to the vehicle 10.

The modified airbag module 120 is basically identical to the airbag module 20 except that the modified airbag module 120 includes a modified obstruction detector 124 that replaces the obstruction detector 24 of the first illustrated embodiment. Therefore, the vehicle airbag control system 12 further comprises the modified obstruction detector 124 and an electronic controller (ECU) that is basically identical to the ECU of the first illustrated embodiment.

The modified vehicle airbag control system 112 further comprises the occupant detector 26 and one or more impact detectors 28 that are identical to the occupant detector 26 and the impact detector 28s of FIG. 1. The detectors 124, 26 and 28 are in electrical communication with the ECU, For brevity, all the components of the modified vehicle airbag control system 112 that are identical to the vehicle airbag control system 12 of the first illustrated embodiment will receive the same reference numerals as the vehicle airbag control system 12. All modified components of the modified vehicle airbag control system 112 will receive the same reference numerals as the vehicle airbag control system 12 of the first illustrated embodiment but increased by 100.

As shown, the modified obstruction detector 124 also detects the presence of an obstruction over the airbag module 20. The modified obstruction detector 124 differs from the obstruction detector 24 in that the modified obstruction detector 124 is disposed at the vehicle structure above the vehicle floor panel 16. In particular, the modified obstruction detector 124 is positioned at the cockpit module 34. Preferably, the modified obstruction detector 124 is fixed to a location on an underside of the cockpit module 34 of the vehicle as shown.

The modified obstruction detector 124 is configured to detect a distance between the modified obstruction detector 124 and an object beneath the modified obstruction detector 124. In the illustrated embodiment, the modified obstruction detector 124 detects a distance between the cockpit module 34 and an object disposed underneath the cockpit module 34. It will be apparent to those skilled in the vehicle field from this disclosure that the modified obstruction detector 124 can be positioned at other vehicle structures, as such as the vehicle's ceiling panel 116 to detect a distance between the ceiling panel 116 and the presence of any objects underneath the ceiling panel 116.

The ECU can be additionally programmed to store a predetermined height that is a distance between the cockpit module 34 and the floor panel 16, Additionally, the ECU can be programmed to store another predetermined height that is a distance between the ceiling panel 116 and the floor panel 16 in the event that the modified obstruction detector 124 is positioned at the ceiling panel 116, In other words, the storage device of the ECU can additionally store the predetermined heights in addition to the information described in the first illustrated embodiment. When the modified obstruction detector 124 detects a predetermined distance that is less than the predetermined heights, the ECU can determine that there is an obstruction over the airbag module 20 and the airbag 22 does not deploy.

For example, the ECU can determine to not deploy the airbag 22 upon the modified obstruction detector 124 detecting a distance that is less than the predetermined height (e.g., the distance between the cockpit module 34 and the floor panel 16 and/or the distance between the ceiling panel 116 and the floor panel 16) by 10 centimeters or more. It will be apparent to those skilled in the vehicle field from this disclosure that the predetermined distance can vary depending on the vehicle size, configuration and where the obstruction detector 24 is placed. It will also be apparent to those skilled in the vehicle field from this disclosure that the ECU can be programmed to deploy the airbag 22 based on a variety of detected distances as necessary to determine that there is an obstruction over the airbag module 20.

Referring to FIG. 10, the storage device can store additional algorithms for the microprocessor to determine whether or not to deploy the airbag. In step P100, the ECU will determine whether an external impact has been detected by any one of the impact detectors 28. If yes, the ECU will determine whether the vehicle seat 18 is occupied by an occupant O based on the detection results of the occupant detector 26 in step P200. If the ECU determines no, then the ECU will not send a deployment signal to the airbag module 20 so that the airbag 22 will not deploy and the process ends, If the occupant detector 26 detects an occupant O in the vehicle seat 18, the ECU will determine whether there is an obstruction over the airbag module 20 based on the detection results of the modified obstruction detector 124 in P300. If the modified obstruction detector 124 detects the presence of an obstruction by detecting a predetermined distance that is less than the predetermined height, then the ECU will not send a deployment signal to the airbag module 20 so that the airbag 22 will not deploy and the process ends. However, if the obstruction detector 24 does not detect an obstruction or a height that is less than the predetermined height, then the ECU will send a deployment signal to the airbag module 20 to deploy the airbag 22 in step P400.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments), the following directional terms "forward", "rearward", "above", "downward", "vertical", "horizontal", "below" and "transverse" as well as any other similar directional terms refer to those directions of a vehicle equipped with the vehicle airbag control system. Accordingly, these terms, as utilized to describe the present invention should be interpreted relative to a vehicle equipped with the vehicle airbag control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to he present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle airbag control system, comprising:
   an airbag module having an airbag that is configured to be positioned below a vehicle floor panel in an undeployed state and above the vehicle floor panel in a deployed state, the airbag being a knee airbag that is configured to extend from the vehicle floor panel over an occupant's knees and substantially underneath the vehicle's cockpit module;
   a detector configured to detect a presence of an obstruction over the airbag module at a location above the vehicle floor panel; and
   an electronic controller programmed to deploy the airbag based on a detected result of the detector.

2. The vehicle airbag control system according to claim 1, wherein
   the electronic controller is programmed to not deploy the airbag module when the detector detects the presence of the obstruction.

3. The vehicle airbag control system according to claim 2, wherein
   the electronic controller is programmed to deploy the airbag module when the detector does not detect the presence of the obstruction.

4. The vehicle airbag control system according to claim 1, wherein the airbag module includes a housing that houses the airbag, the detector being disposed at the housing.

5. The vehicle airbag control system according to claim 4, wherein
the detector is configured to detect a predetermined pressure.

6. The vehicle airbag control system according to claim 1, wherein
the detector is disposed at a vehicle structure above the vehicle floor panel.

7. The vehicle airbag control system according to claim 6, wherein
the detector is configured to detect a presence of an obstruction based on a predetermined distance between the vehicle structure and the vehicle floor panel.

8. The vehicle airbag control system according to claim 7, wherein
the electronic controller is programmed to not deploy the airbag when the detector detects a value that is less than the predetermined distance.

9. The vehicle airbag control system according to claim 1, further comprising
another detector configured to detect a presence of an occupant in a vehicle seat.

10. The vehicle airbag control system according to claim 9, wherein
the controller is programmed to deploy the airbag based on a detected result of the another detector.

11. A vehicle airbag control system, comprising:
an airbag module having an airbag that is configured to be positioned below a vehicle floor panel in an undeployed state and above the vehicle floor panel in a deployed state, the airbag module including a housing that houses the airbag;
a detector configured to detect a presence of an obstruction over the airbag module at a location above the vehicle floor panel, the detector being configured to detect a predetermined pressure, the detector being disposed at the housing; and
an electronic controller programmed to deploy the airbag based on a detected result of the detector, the electronic controller being programmed to not deploy the airbag when the detector detects a value that is more than the predetermined pressure.

12. A vehicle having an airbag control system, comprising:
a vehicle floor panel;
an airbag module having an airbag stored in a compartment below the vehicle floor panel, the airbag being a knee airbag that is configured to extend from the vehicle floor panel over an occupant's knees and substantially underneath the vehicle's cockpit module;
a detector configured to detect a presence of an obstruction over the airbag module; and
an electronic controller programmed to deploy the airbag based on a detected result of the detector.

13. The vehicle airbag control system according to claim 12, wherein
the airbag module includes a housing that houses the airbag of the airbag module, the detector being disposed at the housing.

14. The vehicle airbag control system according to claim 13, wherein
the detector is configured to detect a predetermined pressure.

15. The vehicle airbag control system according to claim 12, wherein
the detector is disposed at a vehicle structure above the vehicle floor panel.

16. The vehicle airbag control system according to claim 15, wherein
the detector is configured to detect a presence of an obstruction based on a predetermined distance between the vehicle structure and the vehicle floor panel.

17. The vehicle airbag control system according to claim 16, wherein
the electronic controller is programmed to not deploy the airbag when the detector detects a value that is less than the predetermined distance.

18. A vehicle airbag control system, comprising:
a vehicle floor panel;
an airbag module stored in a compartment below the vehicle floor panel, the airbag module including a housing that houses an airbag of the airbag module;
a detector configured to detect a presence of an obstruction over the airbag module, the detector being disposed at the housing, the detector being configured to detect a predetermined pressure; and
an electronic controller programmed to deploy the airbag based on a detected result of the detector, the electronic controller being programmed to not deploy the airbag when the detector detects a value that is more than the predetermined pressure.

19. A vehicle airbag module, comprising:
an inflatable portion and a restraining portion, the inflatable portion having a ring-like shape and an opening, the restraining portion being webbing extending from the inflatable portion into the opening, the airbag module being a knee airbag such that the restraining portion is configured to extend from the vehicle floor panel over an occupant's knees and substantially underneath the vehicle's cockpit module.

20. The vehicle airbag module according to claim 19, wherein the restraining portion is elastic.

* * * * *